(12) United States Patent
Mizrahi et al.

(10) Patent No.: US 10,887,240 B2
(45) Date of Patent: Jan. 5, 2021

(54) AUTOMATIC FLOW LEARNING IN NETWORK DEVICES

(71) Applicant: Marvell Israel (M.I.S.L) Ltd., Yokneam (IL)

(72) Inventors: Tal Mizrahi, Haifa (IL); Rami Zemach, Givat Shapira (IL); Carmi Arad, Nofit (IL); David Melman, Tel Aviv (IL); Yosef Katan, Ramat HaSharon (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 31 days.

(21) Appl. No.: 16/261,302

(22) Filed: Jan. 29, 2019

(65) Prior Publication Data

US 2019/0268272 A1 Aug. 29, 2019

Related U.S. Application Data

(60) Provisional application No. 62/635,392, filed on Feb. 26, 2018.

(51) Int. Cl.
*H04L 12/851* (2013.01)

(52) U.S. Cl.
CPC .............................. *H04L 47/2441* (2013.01)

(58) Field of Classification Search
None
See application file for complete search history.

(56) References Cited

U.S. PATENT DOCUMENTS

| | | |
|---|---|---|
| 5,559,801 A | 9/1996 | Lo |
| 6,473,400 B1 | 10/2002 | Manning |
| 6,873,600 B1 | 3/2005 | Duffield et al. |
| 6,970,462 B1 | 11/2005 | McRae |
| 7,092,360 B2 | 8/2006 | Saint-Hilaire et al. |
| 7,215,637 B1 | 5/2007 | Ferguson et al. |
| 7,227,842 B1 | 6/2007 | Ji et al. |
| 7,359,968 B1 | 4/2008 | Ng et al. |
| 7,386,699 B1 | 6/2008 | Bishara |
| 7,424,019 B1 | 9/2008 | Kopelman et al. |
| 7,644,157 B2 | 1/2010 | Shomura et al. |
| 7,684,320 B1 | 3/2010 | Nucci |
| 7,688,727 B1 | 3/2010 | Ferguson et al. |
| 8,582,428 B1 * | 11/2013 | Bishara ............... H04L 47/2441 370/229 |
| 10,243,865 B2 | 3/2019 | Izenberg et al. |

(Continued)

*Primary Examiner* — Shripal K Khajuria

(57) ABSTRACT

In a network device, a flow classification hardware engine is configured to: store flow state information regarding known flows of packets in a flow information table in association with respective assigned flow identifiers (IDs). The assigned flow IDs are from an ordered set of M flow IDs, where M is a positive integer. In response to detecting new flows of packets, the flow classification hardware engine: i) assigns respective flow IDs, from the ordered set of M flow IDs, to the new flows, and ii) creates respective entries in the flow information table for the new flows. An embedded processor periodically, as part of a background process: i) identifies an oldest assigned flow ID, from the ordered set of M flow IDs, and ii) makes storage space in the flow information table corresponding to the oldest assigned flow ID available for a new flow.

24 Claims, 8 Drawing Sheets

(56) References Cited

U.S. PATENT DOCUMENTS

| | | | |
|---|---|---|---|
| 2003/0223424 A1* | 12/2003 | Anderson | H04L 45/7453 |
| | | | 370/392 |
| 2004/0148382 A1 | 7/2004 | Narad et al. | |
| 2005/0276230 A1* | 12/2005 | Akahane | H04L 43/00 |
| | | | 370/252 |
| 2006/0048228 A1 | 3/2006 | Takemori et al. | |
| 2006/0123467 A1 | 6/2006 | Kumar et al. | |
| 2007/0061433 A1 | 3/2007 | Reynolds et al. | |
| 2007/0070907 A1* | 3/2007 | Kumar | H04L 47/30 |
| | | | 370/235 |
| 2007/0076606 A1 | 4/2007 | Olesinski et al. | |
| 2007/0201379 A1 | 8/2007 | Kondapalli | |
| 2007/0223388 A1 | 9/2007 | Arad et al. | |
| 2007/0268922 A1 | 11/2007 | Dougan et al. | |
| 2008/0212586 A1 | 9/2008 | Wang et al. | |
| 2008/0225853 A1 | 9/2008 | Melman et al. | |
| 2008/0240113 A1 | 10/2008 | Arad et al. | |
| 2015/0281098 A1* | 10/2015 | Pettit | H04L 49/9042 |
| | | | 370/235 |
| 2018/0131602 A1* | 5/2018 | Civanlar | H04L 49/3009 |

\* cited by examiner

AUTOMATIC FLOW LEARNING IN NETWORK DEVICES

CROSS REFERENCES TO RELATED APPLICATIONS

This application claims the benefit of U.S. Provisional Patent Application No. 62/635,392, entitled "Method and Apparatus for Automatic Flow Learning in Network Devices," filed on Feb. 26, 2018; which is incorporated herein by reference in its entirety.

FIELD OF TECHNOLOGY

The present disclosure relates generally to network devices such as switches and routers, and more particularly to flow monitoring in network devices.

BACKGROUND

It is often useful to obtain traffic flow measurements in a communication network. For example, such measurements may be used to characterize flows using parameters such as flow duration, volume, time, burstiness, etc. Flow traffic information may be useful for network planning, optimizing network resource utilization or traffic performance, detection of and defense against network attack/intrusion, quality of service (QoS) monitoring, usage-based accounting, etc.

Traffic flow measurements may be made by a network device such as a bridge, switch, or router, for example, or some other measurement device. Then, these measurements may be utilized for various processes such as traffic metering, traffic profiling, traffic engineering, an attack/intrusion detection, accounting, QoS validation, etc. For example, a traffic profiling application may utilize flow measurements taken at multiple different nodes (e.g., routers, bridges, switches, etc.) in a network so as to analyze traffic in different portions of the network.

SUMMARY

In an embodiment, a network device comprises: a packet processor coupled to a plurality of network ports, wherein the packet processor is configured to forward packets between the plurality of network ports, and wherein the packet processor includes: a first memory, and a flow classification hardware engine configured to: store flow state information regarding known flows of packets in a flow information table in the first memory in association with respective assigned flow identifiers (IDs), wherein the assigned flow IDs are from an ordered set of M flow IDs, wherein M is a positive integer, and in response to detecting new flows of packets: i) assign respective flow IDs, from the ordered set of M flow IDs, to the new flows, and ii) create respective entries in the flow information table for the new flows; and an embedded processor that is configured to execute machine readable instructions stored in a second memory coupled to the embedded processor, and wherein the second memory stores instructions that, when executed by the embedded processor, cause the embedded processor to, periodically, as part of a background process: i) identify an oldest assigned flow ID, from the ordered set of M flow IDs, and ii) make storage space in the flow information table corresponding to the oldest assigned flow ID available for a new flow.

In another embodiment, a method for monitoring flows of packets in a network device includes: assigning, at a flow classification hardware engine of the network device, flow identifiers (IDs) in response to ingressing packets that belong new flows that are not recognized by the flow classification hardware engine as corresponding to currently assigned flow IDs, wherein assigning flow IDs includes, for each new flow, selecting an oldest unassigned flow ID from an ordered set of M flow IDs to assign to the new flow, and wherein M is a positive integer; creating, by the flow classification hardware engine, respective entries in a flow information table for the new flows; updating, by the flow classification hardware engine, flow state information in the flow information table in response to ingressing packets that belong to flows that are recognized by the flow classification hardware as corresponding to currently assigned flow IDs; performing, by an embedded processor of the network device, a background process to: periodically de-assign oldest assigned flow IDs from among the ordered set of M flow IDs, and in connection with de-assigning the oldest assigned flow IDs, make entries in the flow information table available for new flows.

DETAILED DESCRIPTION

Figure 1A:
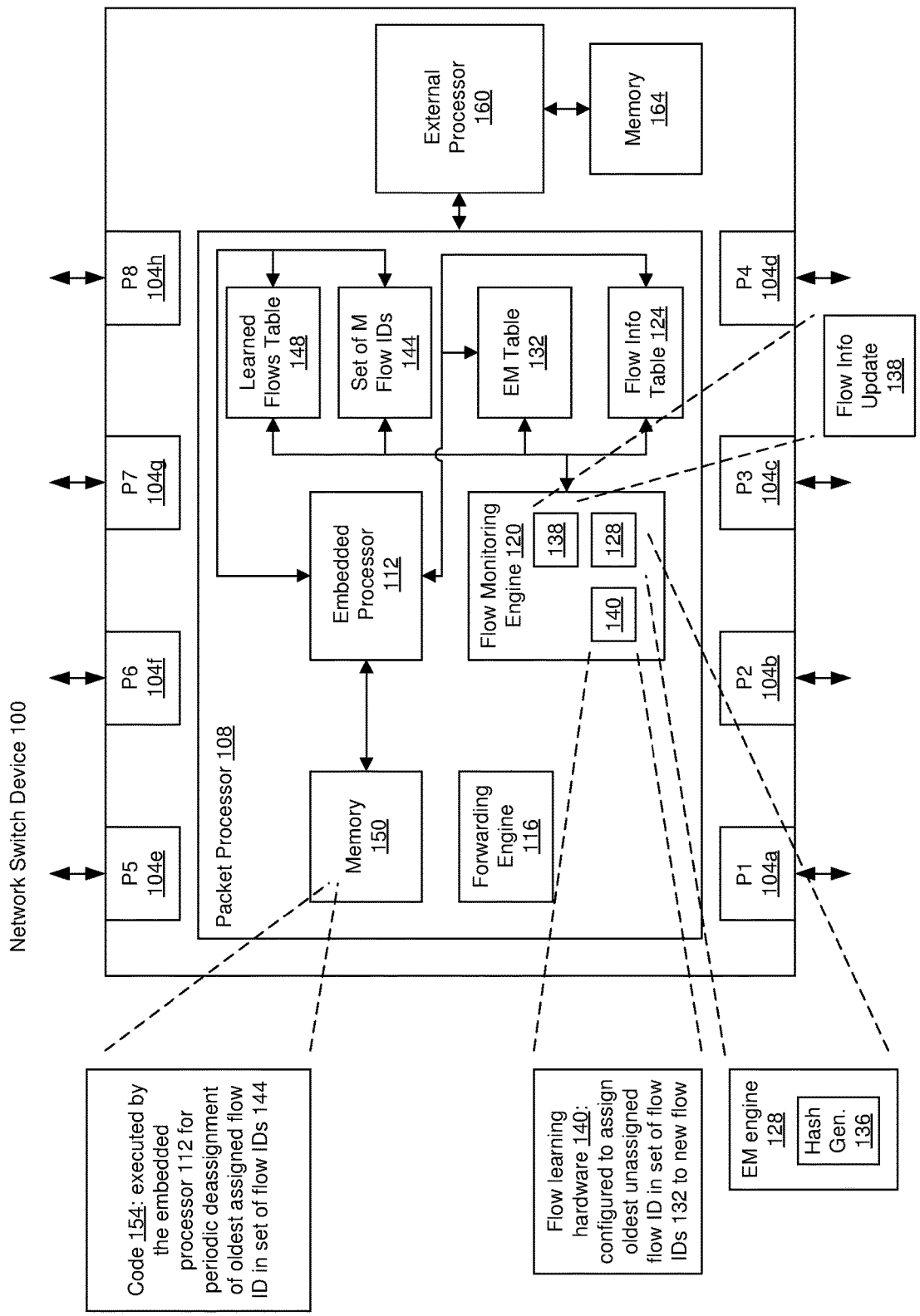
FIG. 1A is block diagram of an example network device configured for flow monitoring, according to an embodiment.

FIG. 1A is a block diagram of an example network device 100, such as a bridge, switch, router, etc., that includes capabilities for traffic flow learning, flow classification, and measurement, according to an embodiment. As described in more detail below, the network device 100 includes hardware configured to autolearn new packet flows. Using hardware to autolearn new flows is especially beneficial for handling bursts of new flows, i.e., when a rate of new flows is high during a relatively short period of time. Prior art network devices often use software for learning new flows, but learning bursts of new flows with software-based flow learning is challenging.

Additionally, as further described below, a background process of the network device 100 periodically removes old flows from a table of flows learned by the network device 100 so that the table has room for new flows. By periodically removing old flows from the table at a high rate, the network device 100 is able to learn new flows at a high rate even when the table is full, according to an embodiment.

The network device 100 includes a plurality of network interfaces 104 (sometimes referred to herein as "ports") that are configured to couple to network communication links. The network device 100 also includes a packet processor 108 coupled to the plurality of ports 104. In an embodiment, the packet processor 108 is implemented on a single integrated circuit (IC) (sometimes referred to as a. "chip"). For example, the packet processor 108 corresponds to a "system on a chip" (SoC) that integrates various components (including an embedded processor 112) of the network device 100 onto the single IC. In another embodiment, the packet processor 108 is implemented on multiple ICs that correspond to a multi-chip module (MCM) in which the multiple ICs are integrated, e.g., onto a unifying substrate, and integrated within a single IC package having IC pins. In an embodiment, the multiple ICs are internally (e.g., within the IC package) connected together by fine wires and/or with conductors embedded in the unifying substrate. In yet another embodiment, the packet processor 108 is implemented on multiple ICs that correspond to a system-in-a-package (SiP). SiPs are generally similar to MCMs, but with SiPs the multiple ICs can be stacked vertically or tiled horizontally within a single IC package.

The packet processor 112 includes a forwarding engine 116 coupled to the plurality of ports 104. The forwarding engine 116 is configured to forward packets between the plurality of ports 104 based on, for example, analyzing information (e.g., one or more of destination addresses, virtual local area network (VLAN) identifiers, etc.) in headers of the packets.

The packet processor 108 further includes a flow monitoring engine 120 that is configured to classify received packets into flows, and to maintain flow state information regarding the flows in a flow information table 124. A flow corresponds to related series of packets. As one example, some flows, such as Internet Protocol (IP) transmission control protocol (TCP)/user datagram protocol (UDP) flows, are typically defined in the networking industry by a 5-tuple such as {destination IP address, source IP address, L4 Protocol, UDP/TCP destination port, UDP/TCP source port}. In other examples, flows are merely identified by a particular source address and/or a particular destination address in headers of packets. For instance, all packets having a particular IP source address correspond to a particular flow, or all packets having a particular IP destination address correspond to a particular flow. As yet another example, all packets having both a particular IP source address and a particular IP destination address correspond to a particular flow. Similarly, packets having a particular media access control (MAC) source address and/or a particular MAC destination address correspond to a particular flow. Other information in packet headers additionally or alternatively are used to define a flow, such as one or more of a particular packet type, a particular virtual local area network (VLAN) identifier (ID), etc.

The flow monitoring engine 120 generally determines whether an ingressing packet belongs to an existing flow (i.e., a flow that the flow monitoring engine previously identified and of which flow monitoring engine 112 is currently aware) or belongs to a currently unknown flow (sometimes referred to in the present disclosure as a "new flow"). The flow monitoring engine 120 assigns flow identifiers (IDs) to existing flows. When the flow monitoring engine 120 determines that an ingressing packet belongs to an existing flow, the flow monitoring engine 120 uses the flow ID of the existing flow to identify flow state information in the flow information table 124 that are to be updated in response to the ingressing packet, according to an embodiment.

An existing flow, i.e., a flow to which a flow ID is currently assigned is sometimes referred to herein as a "learned" flow (e.g., the flow has been learned by the flow monitoring engine 120), as opposed to a flow to which a flow ID is not currently, assigned is (i.e., a new flow). "Learning" a new flow, as used herein, generally refers to the flow monitoring engine 120 assigning a flow ID to the flow and configuring the flow monitoring engine 120 to recognize packets in the flow as belonging to the learned flow. "Unlearning" an existing flow, as used herein, generally refers to de-assigning a flow ID that was assigned to the flow (so that the flow ID is unassigned and is available to be assigned in the future to a new flow) and configuring the flow monitoring engine 120 to no longer recognize packets in the flow as belonging to an existing flow.

When a packet, which is deemed eligible for automatic flow learning, is received via one of the ports 104 (an ingressing packet) and does not belong to an existing (or learned) flow (i.e., the packet belongs to a new flow), the flow monitoring engine 120 is configured to automatically learn the new flow. Learning the new flow includes assigning a flow ID to the flow, according to an embodiment. However, the flow monitoring engine 120 is capable of monitoring (or at least is constrained to monitor) at most M flows at a given time, where M is a suitable positive integer, according to an embodiment. To account for a limitation on the number of flows that can be monitored by the flow monitoring engine 120, the embedded processor 112 is programmed to periodically cause the flow monitoring engine 120 to unlearn an existing flow, which typically includes de-assigning a flow ID that was assigned to the flow, according to an embodiment. For example, the embedded processor 112 periodically selects one existing flow, from among all of the currently known flows, that was learned prior to any of the other currently known flows (sometimes referred to herein as the oldest existing flow), and the selected existing flow is then unlearned. By periodically unlearning existing flows, the flow monitoring engine 120 can continue to automatically and seamlessly learn new flows, even though the flow monitoring engine 120 is constrained to monitoring at most M flows at a given time, according to an embodiment. It is noted that in some embodiments "new flows" may actually include flows that had been previously learned, then subsequently unlearned, and are learned again.

The periodic unlearning of old flows may be considered a background process performed by the packet processor 108 to facilitate the flow monitoring engine 120 being able to continually learn new flows at a high rate even though the flow monitoring engine 120 is constrained to monitoring at most M flows at a given time. If a still active flow is unlearned by the periodic background process, it is quickly relearned by the flow monitoring engine 120.

The flow monitoring engine 120 includes a flow classification engine 128. In an embodiment, the flow classification engine 128 comprises an exact match (EM) engine that is coupled to an EM table 132. The EM table 132 generally stores information for identifying packets that belong to existing flows that have already been learned by the EM engine of the flow classification engine 128. For example, at least at some times during operation, some entries in the EM table 132 correspond to existing flows, whereas other entries in the EM table 132 store a default value that is indicative of a new flow that is to be learned by the flow monitoring engine 120.

In an embodiment, the EM engine of the flow classification engine 128 includes a hash generator 136 configured to generate a hash value at least by applying a hashing function to information associated with a packet, such as one or more fields (e.g., address fields) in one or more headers of the packet. The generated hash value indicates a particular entry (or group of entries) in the EM table 132. For example, the generated hash value is an address or pointer to a particular entry (or group of entries) in the EM table 132. As another example, the generated hash value maps (upon applying a mapping function) to an address of the particular entry (or group of entries) in the EM table 132.

Each entry in the EM table 132 corresponding to a learned flow includes information common to packets in the learned flow, such as common value(s) of one or more fields (e.g., address fields) in one or more packet headers of packets in the existing flow. When an ingressing packet hashes to a particular entry (or group of entries) in the EM table 132, the EM engine 128 compares header information in the packet to the information stored in the entry (or group of entries) in the EM table 132 to confirm whether the packet belongs to an existing flow.

Each entry in the EM table 132 corresponding to an existing flow also includes the flow ID that was assigned to that flow. Thus, when i) an ingressing packet hashes to a particular entry in the EM table 132, and ii) the EM engine 128 confirms that the ingressing packet belongs to the flow corresponding to the entry in the EM table 132, the EM engine 128 retrieves the flow ID from the entry. The flow monitoring engine 120 then uses the retrieved flow ID to identify flow state information in the flow information table 124 that is to be updated in response to the ingressing packet, according to an embodiment. In an embodiment, the flow monitoring engine 120 includes flow information update circuitry 138 configured to i) use the retrieved flow ID to identify flow state information in the flow information table 124, and ii) then update the identified flow state information in the flow information table 124 in response to the ingressing packet, according to an embodiment.

On the other hand, when i) the ingressing packet hashes to a particular entry in the EM table 132, and ii) the particular entry is set to the default value that corresponds to "learning" of a new flow by the flow monitoring engine 120, this indicates that the ingressing packet belongs to a flow that is not currently known by the flow monitoring engine 120. The flow monitoring engine 120 is configured to, in response thereto, learn the new flow such that the new flow is subsequently handled by the flow monitoring engine 120 as an existing flow. "Learning" the new flow includes assigning a flow ID to the new flow, and creating an entry in the EM table 132 so that subsequently received packets in the flow will be recognized as corresponding to the assigned flow ID.

The flow monitoring engine 120 includes flow learning hardware circuitry 140 that is configured to perform actions associated with learning a new flow. For example, when EM engine 128 determines that an ingressing packet belongs to a new flow that is to be "learned" by the flow monitoring engine 120, the flow learning hardware circuitry 140 is configured to assign a flow ID to the new flow. In an embodiment, the flow learning hardware circuitry 140 selects an unassigned flow ID (i.e., a flow ID that is not currently assigned to an existing flow) from an ordered set of M flow IDs 144, and designates or denotes the selected flow ID as assigned. More specifically, the flow learning hardware circuitry 140 is configured to i) select an unassigned flow ID, among the ordered set of M flow IDs 144, that is indicated by a first pointer, and ii) then increment (in a circular or modulo manner) the first pointer to point to a next unassigned flow ID in the ordered set of M flow IDs 144. In an embodiment, the first pointer indicates an oldest unassigned flow ID, i.e., a flow ID among the ordered set of M flow IDs 144 that has remained unassigned for the longest time. As will be described in more detail below, by incrementing the first pointer, the flow ID that was previously indicated by the first pointer is now denoted as assigned, and the first pointer now points to the "new" oldest unassigned flow ID, according to an embodiment.

Because the flow monitoring engine 120 selects flow IDs to assign to flows from the ordered set of M flow IDs 144, the flow monitoring engine 120 is capable of (or at least constrained to) "knowing" at most M flows at a time, according to an embodiment. To permit the flow monitoring engine 120 to continue to automatically learn new flows and assign flow IDs to the new flows, the embedded processor 112 periodically performs a background process to unlearn flows and unassign flow IDs to therefore make room for new flows to be learned by the flow monitoring engine 120. To ensure that the flow monitoring engine 120 is able to learn new flows at a certain rate, the embedded processor 112 periodically unlearn flows and unassigns flow IDs at the certain rate, at least when a number of assigned flow IDs has reached a threshold, according to an embodiment.

The embedded processor 112 is programmed to, as part of causing a flow to be unlearned, periodically select an assigned flow ID from the ordered set of M flow IDs 144 to be unassigned. More specifically, the embedded processor 112 is programmed to i) select an assigned flow ID, among the ordered set of M flow IDs 144, that is indicated by a second pointer, and ii) then increment (in a circular or modulo manner) the second pointer to point to a next assigned flow ID in the ordered set of M flow IDs 144. In an embodiment, the second pointer indicates an oldest assigned flow ID, i.e., a flow ID among the ordered set of M flow IDs 144 that has been assigned for the longest time. As will be described in more detail below, by incrementing the second pointer, the flow ID that was previously indicated by the second pointer is now denoted as unassigned, and the second pointer now points to the "new" oldest assigned flow ID, according to an embodiment.

Additionally, when "learning" a new flow, the flow learning hardware circuitry 140 is configured to store in a table 148 an address in the EM table 132 that corresponds to the new flow in an entry of the table 148 that corresponds to the flow ID of the new flow. For example, the table of learned flows 148 is indexed by the flow ID, or an index into the table 148 is generated by applying a mapping function to the flow ID, in some embodiments.

Optionally, the flow monitoring engine 120 is configured to forward packets of flows that have been learned by the flow learning hardware circuitry 140, initially after learning the new flow, to the embedded processor 112 (e.g., the flow monitoring engine 120 forwards N packets to the embedded processor 112), according to an embodiment. Optionally, the embedded processor 112 is programmed to process packets forwarded by the flow monitoring engine 120 to perform flow classification operations, according to an embodiment. In an embodiment, the embedded processor 112 is optionally programmed to modify an entry in the EM table 132 based on the processing of packets forwarded by the flow monitoring engine 120.

The embedded processor 112 of the embodiment seen in FIG. 1A is coupled to a memory 150. In an embodiment, the memory 150 stores a set 154 of machine readable instructions that, when executed by the embedded processor 112, cause the embedded processor 112 to periodically deassign a flow ID, such as an oldest assigned flow ID in the ordered set of M flow IDs 144, and to reconfigure the flow monitoring engine 120 so that the flow monitoring engine 120 no longer recognizes the flow corresponding to the deassigned flow ID. In an embodiment, the memory 150 also stores another set of machine readable instructions (not shown in FIG. 1A) that, when executed by the embedded processor 112, cause the embedded processor 112 to, in connection with deassigning a flow ID, retrieve flow state information corresponding to the deassigned flow ID from the flow information table 124 and store the flow state information in the memory 150 as a flow record cache corresponding to the flow.

The network device 100 of the FIG. 1A further comprises an external processor 160 coupled to the packet processor 108 and a memory 164. In an embodiment, the embedded processor 112 is programmed to periodically, in response to events, and/or in response to prompts from the external processor 160, send flow state information (e.g., flow record caches) to the external processor 160. In an embodiment, the embedded processor 112 is configured to delete a flow record cache from the memory 150 after sending the flow record cache to the external processor 160. The external processor 160 is programmed to maintain flow records, in the memory 164, based on flow state information (e.g., flow record caches) received from the embedded processor 112. For example, the memory 164 stores machine readable instructions that, when executed by the external processor 160, cause the external processor 160 to maintain flow records, in the memory 164, based on flow state information (e.g., flow record caches) received from the embedded processor 112. In an embodiment in which an active flow is unlearned and then relearned, the memory 164 may already include a flow record corresponding to the flow when the external processor 160 receives a flow record cache from the embedded processor 112; and the external processor 160 therefore updates the existing flow record in the memory 164 using the flow record cache received from the embedded processor 112. In an embodiment, the memory 164 stores machine readable instructions that, when executed by the external processor 160, cause the external processor 160 to, in conjunction with receiving, from the embedded processor 112, flow state information. (e.g., a flow record cache) corresponding to a flow corresponding to a particular flow ID, update an existing flow record in the memory 164 corresponding to the particular flow ID.

In an embodiment, the memory 150 comprises a single memory device, and the single memory device stores i) the machine readable instructions executed by the embedded processor 112, and ii) the flow record caches. In another embodiment, the memory 150 comprises a first memory device and a second memory device; and the first memory device (e.g., a read only memory (ROM), a random access memory (RAM), a flash memory, etc.) stores the machine readable instructions executed by the embedded processor 112, whereas the second memory device (e.g., a RAM, a flash memory, etc.) stores the flow record caches.

In an embodiment, the set of M flow IDs 144, the EM table 132, and the flow information table 124 are stored in a single memory device (e.g., a RAM, a flash memory, etc.) of the packet processor 108. In another embodiment, the set of M flow IDs 144, the EM table 132, and the flow information table 124 are stored in at least two memory devices (e.g., including one or more of i) one or more RAMs, ii) one or more flash memories, iii) one or more register sets, etc.) of the packet processor 108. For example, in an embodiment, the set of M flow IDs 144 are stored in a first memory device (e.g., a first RAM, a first register set, etc.), whereas the EM table 132, and the flow information table 124 are stored in a second memory device (e.g., a second RAM, a second register set, etc.). As another example, the set of M flow IDs 144 are stored in a first memory device (e.g., a first RAM, a first register set, etc.), the EM table 132 is stored in a second memory device (e.g., a second RAM, a second register set, etc.), and the flow information table 124 is stored in a third memory device (e.g., a third RAM, a third register set, etc.).

Figure 1B:
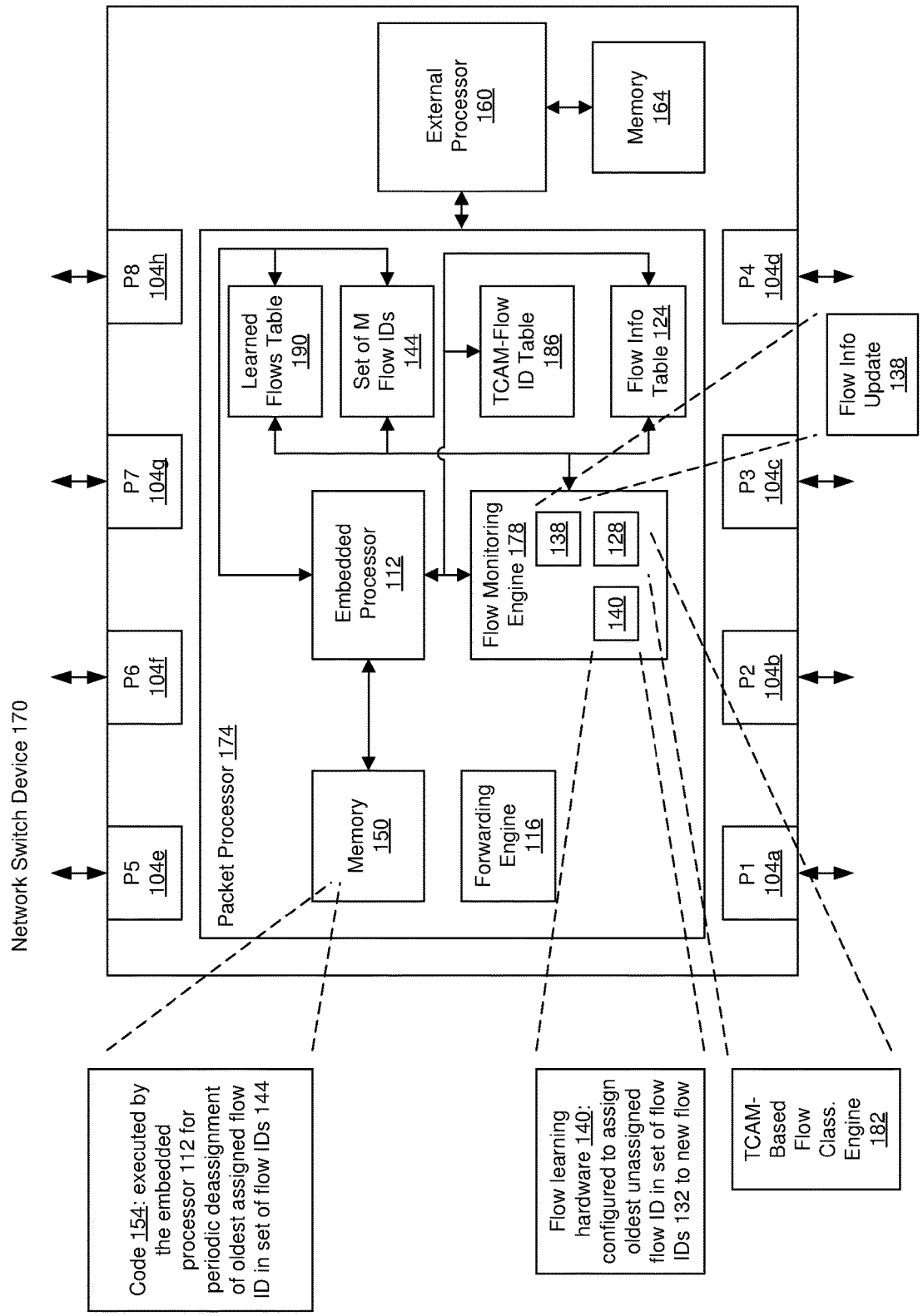
FIG. 1B is block diagram of another example network device configured for flow monitoring, according to another embodiment.

FIG. 1B is a block diagram of another example network device 170, according to another embodiment. The example network device 170 is similar to the network device 100 of FIG. 1A, and like-numbered elements are not discussed in detail for purposes of brevity.

The network device 170 include a packet processor 174, similar to the packet processor 108 of FIG. 1A. Unlike the packet processor 108 of FIG. 1A, the packet processor 174 includes a flow monitoring engine 178 with a content addressable memory (CAM) such as a binary CAM or a ternary CAM (WAN). For purposes of brevity, only a ternary content addressable memory (TCAM)-based flow classification engine 182, instead of the EM engine 128 of FIG. 1A, is described; reference to a TCAM herein includes other suitable types of CAM devices as well. The TCAM-based flow classification engine 182 includes a TCAM configured to recognize packets that belong to existing (or learned) flows. The TCAM-based flow classification engine 182 is coupled to a table 186 that maps entries (e.g., rows) of the TCAM to flow IDs of existing flows. In an embodiment, the table 186 is indexed using a TCAM row match. The TCAM is also configured to have a default entry that corresponds to new flows, and which prompts the flow monitoring engine 178 to learn the new flow. The flow monitoring engine 178 learning the new flow includes: i) assigning a flow ID to a flow in a manner similar to the techniques described with reference to FIG. 1A, ii) creating a row in the TCAM configured corresponding to the flow and the assigned flow ID, iii) updating the table 186 to map the row in the TCAM to the assigned flow ID, and iv) and updating another table 190 that indicates the row in the TCAM that corresponds to the flow and the assigned flow ID. In an embodiment, the table 190 is indexed using flow IDs.

Figure 2:
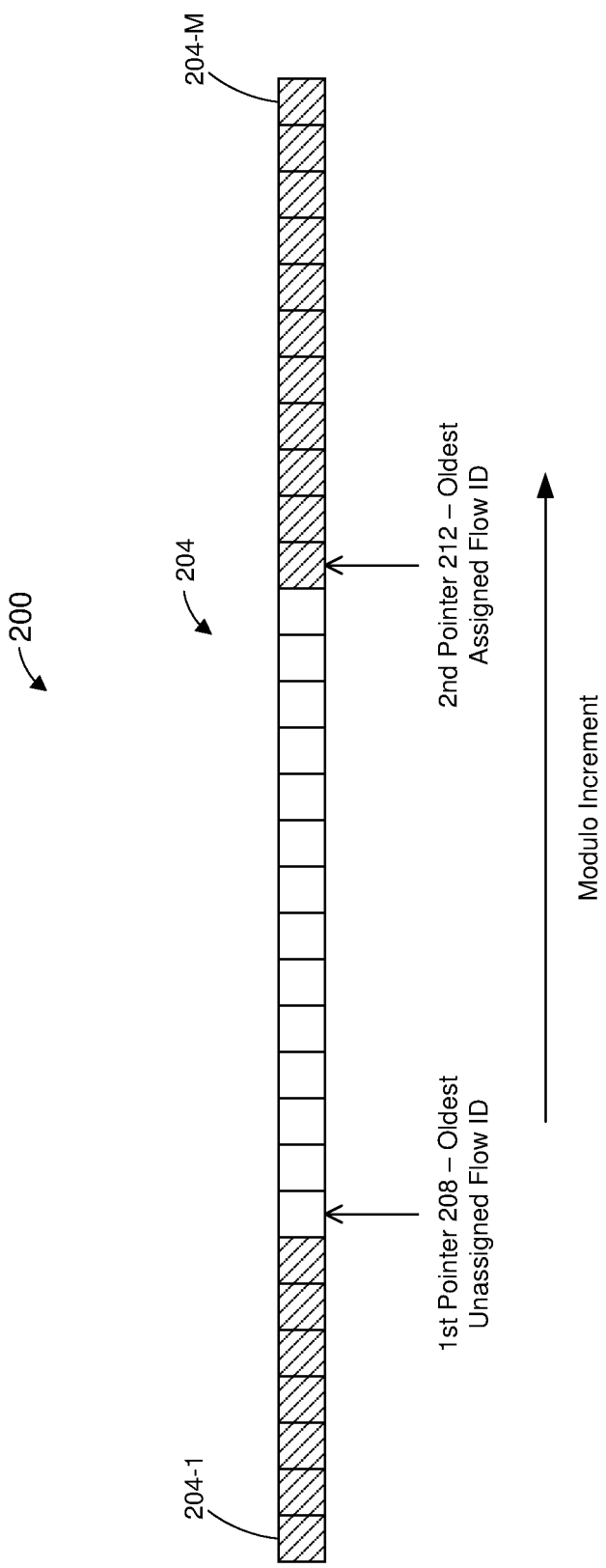
FIG. 2 is a diagram of an example memory structure for storing an ordered set of flow identifiers (IDs) utilized by the network devices of FIGS. 1A and 1B, according to an embodiment.

FIG. 2 is a diagram of an example memory structure 200 for storing an ordered set of M flow IDs such as the ordered set of M flow IDs 144 in FIGS. 1A-B, according to an embodiment. The memory structure 200 is included in the packet processor 108/174 of FIGS. 1A-B for storing the ordered set of M flow IDs 144, according to an embodiment. In an embodiment, the memory structure 200 is included in a RAM, a flash memory, etc., of the packet processor 108. In other embodiments, the ordered set of M flow IDs 144 in the packet processor 108/174 of FIGS. 1A-B are stored in another suitable memory structure.

The memory structure 200 includes a plurality of ordered memory locations 204. The ordering of the memory locations 204 corresponds to an index that increases from the left side of FIG. 2 to the right side of FIG. 2. For example, the leftmost location 204-1 is a lowest location in the ordering, whereas the rightmost location 204-M is a highest location in the ordering. The ordering of the memory locations 204 is circular or modulo. For example, a next increase in the ordering past the rightmost location 204-M corresponds to the leftmost location 204-1.

In an embodiment, each memory location 204 stores a unique flow ID. In FIG. 2, cross-hatching indicates a memory location 204 that stores a flow ID that has been assigned to a flow, whereas memory locations 204 without cross-hatching store a flow ID that is not currently assigned to a flow (e.g., an unassigned flow ID).

A first pointer 208 indicates an oldest unassigned flow ID, whereas a second pointer 212 indicates an oldest assigned flow ID. In an embodiment, when the flow learning hardware circuitry 140 (FIGS. 1A-B) assigns a flow ID to a new flow, the flow learning hardware circuitry 140 selects an unassigned flow ID, among the ordered set of NI flow IDs 144, that is indicated by the first pointer 208, and ii) then increments (in a circular or modulo manner) the first pointer 208 to point to a next unassigned flow ID in the ordered set of M flow IDs 144. In an embodiment, when the first pointer 208 is incremented, the flow ID that was previously indicated by the first pointer 208 is now denoted as being assigned. In an embodiment, when the first pointer 208 is pointing to the rightmost location 204-M and is then incremented, the first pointer 208 will then point to the leftmost location 204-1.

In an embodiment, when the embedded processor 112, as part of periodically causing a flow to be unlearned, selects an assigned flow ID, among the ordered set of NI flow IDs 144, that is indicated by the second pointer 212, the second pointer 212 is then incremented (in a circular or modulo manner) to point to a next assigned flow ID in the ordered set of M flow IDs 144. In an embodiment, when the second pointer 212 is incremented, the flow ID that was previously indicated by the second pointer 212 is now denoted as being unassigned. In an embodiment, when the second pointer 212 is pointing to the rightmost location 204-NI and is then incremented, the second pointer 212 will then point to the leftmost location 204-1.

A distance (measured in a circular or modulo manner) between the first pointer 208 and the second pointer 212 indicates how many unassigned flow IDs remain. In an embodiment, the flow monitoring engine 120/178 (FIGS. 1A-B) is configured to determine a number of unassigned flow IDs by measuring (in a circular or modulo manner) a distance between the first pointer 208 and the second pointer 212. Determining the number of unassigned flow IDs is useful for determining whether to adjust a rate at which flow IDs are unassigned as part of the background process (performed by the embedded processor 112) to periodically unlearn flows and unassign flow IDs to therefore make room for new flows to be learned by the flow monitoring engine 120/178. For example, in response to determining that the number of unassigned flow IDs has fallen below a threshold, the embedded processor 112 is configured to increase a rate at which flow IDs are unassigned as part of the background process (to periodically unlearn flows and unassign flow IDs, according to an embodiment. In some embodiments, multiple different thresholds of unassigned flow IDs correspond to different rates at which flow IDs are unassigned. In some embodiments, if the number of unassigned flow IDs is above a particular threshold, the background process to unassign flow IDs is halted until the number of unassigned flow IDs falls below the particular threshold. In an embodiment, the background process to unassign flow IDs is halted when the number of unassigned flow IDs is M.

In other embodiments, the number of assigned flow IDs is instead used to determine whether to adjust a rate at which flow IDs are unassigned as part of the background process (performed by the embedded processor 112). For example, in response to determining that the number of assigned flow IDs has risen above a threshold, the embedded processor 112 is configured to increase a rate at which flow IDs are unassigned as part of the background process (to periodically unlearn flows and unassign flow IDs, according to an embodiment. In some embodiments, multiple different thresholds of assigned flow IDs correspond to different rates at which flow IDs are unassigned. In some embodiments, if the number of assigned flow IDs is below a particular threshold, the background process to unassign flow IDs is halted until the number of unassigned flow IDs falls below the particular threshold. In an embodiment, the background process to unassign flow IDs is halted when the number of assigned flow IDs is 0.

Figure 3:
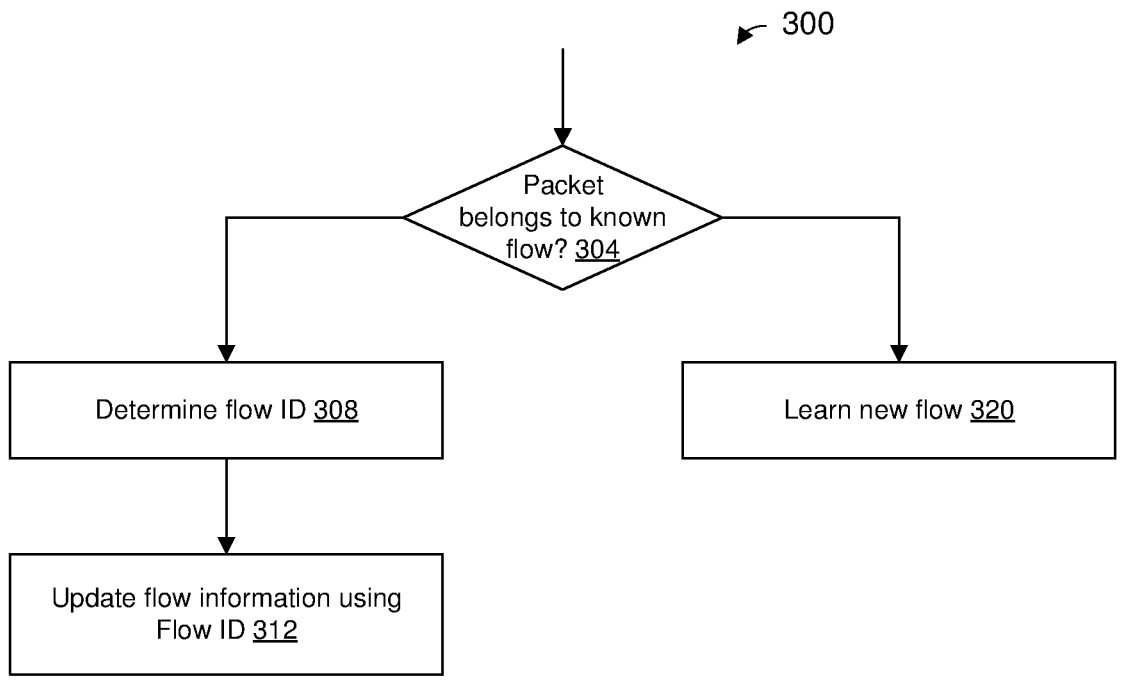
FIG. 3 is a flow diagram of an example method for flow classification implemented by the network devices of FIGS. 1A and 1B, according to an embodiment.

FIG. 3 is a flow diagram of an example flow classification method 300 implemented by a flow monitoring engine, such as the flow monitoring engine 120/178 (FIGS. 1A-B) or another suitable flow monitoring engine, according to an embodiment. The method 300 is described with reference to the flow monitoring engine 120 merely for explanatory purposes. In other embodiments, the method 300 is implemented by another suitable flow monitoring engine.

At block 304, the flow monitoring engine 120/178 determines whether an ingressing packet belongs to a known (or existing) flow. For example, the EM engine 128 (FIG. 1A) determines whether the ingressing packet belongs to a known flow such as described above. For instance, the hash generator 136 of the EM engine 128 generates a hash value at least by applying a hashing function to information associated with a packet, such as one or more fields (e.g., address fields) in one or more headers of the packet, and the generated hash value indicates a particular entry (or group of entries) in the EM table 132. The EM engine 128 compares header information in the packet to the information stored in the entry (or group of entries) in the EM table 132 to determine whether the packet belongs to a known flow. As another example, the TCAM-based flow classification engine 182 (FIG. 1B) determines whether the ingressing packet belongs to a known flow such as described above. For instance, the TCAM-based flow classification engine 182 generates a key using information from a header of the ingressing packet and determines whether the key matches any entries in the TCAM corresponding to known flows.

If the flow monitoring engine 120/178 determines that the ingressing packet belongs to a known flow, the flow proceeds to block 308. At block 308, the flow monitoring engine 120/178 determines a flow ID corresponding to the flow to which the ingressing packet belongs. For example, when the EM engine 128 (FIG. 1A) confirms that the ingressing packet belongs to the flow corresponding to the entry in the EM table 132, the EM engine 128 retrieves the flow ID from the entry in the EM table 132. As another example, when the TCAM-based flow classification engine 182 (FIG. 1B) determines that the ingressing packet belongs to a known flow such as described above. For example, when the TCAM indicates a match with the ingressing packet, the TCAM-based flow classification engine 182 retrieves the corresponding flow ID from the corresponding entry in the table 186. For example, the table 186 is indexed by the TCAM row match, and entries of the table 186 store flow IDs.

At block 312, the flow monitoring engine 120/178 uses the determined flow ID to identify flow state information in the flow information table 124 that are to be updated in response to the ingressing packet. For example, the flow information update circuitry 138 uses the retrieved flow ID to identify flow state information in the flow information table 124, and then updates the identified flow state information in the flow information table 124 in response to the ingressing packet, according to an embodiment. Updating flow state information in response to an ingressing packet is described in more detail below with reference to FIG. 4.

On the other hand, if the flow monitoring engine 120/178 determines at block 304 that the ingressing packet does not belong to a known flow, the flow proceeds to block 320. At block 320, the flow monitoring engine 120/178 learns the flow to which the ingressing packet belongs. For example, the flow learning hardware 140 (FIGS. 1A-B) learns the new flow as discussed above. Learning a new flow is described in more detail below with reference to FIG. 5.

Figure 4:
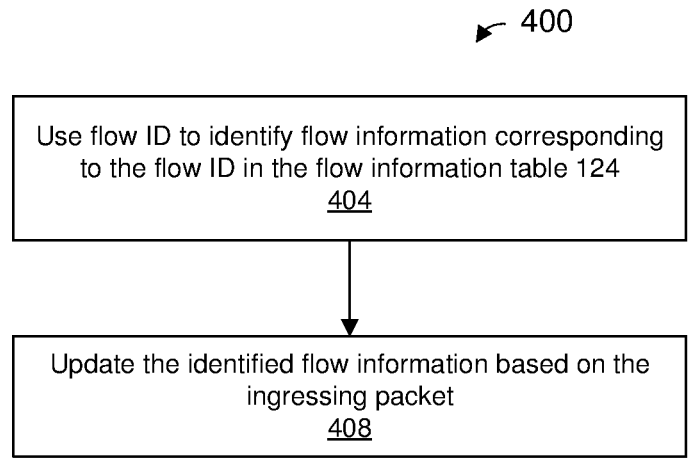
FIG. 4 is a flow diagram of an example method for updating flow state information in response to an ingressing packet corresponding to a flow recognized by a network device, according to an embodiment.

FIG. 4 is a flow diagram of an example method 400 for updating flow state information in response to an ingressing packet corresponding to an existing flow, according to an embodiment. The method 400 is implemented by a flow monitoring engine, such as the flow monitoring engine 120/178 (FIGS. 1A-B) or another suitable flow monitoring engine, according to an embodiment. For example, the method 400 is implemented by the flow information update circuitry 138 (FIGS. 1A-B), according to an embodiment. The method 400 is described with reference to the flow monitoring engine 120/178 merely for explanatory purposes. In other embodiments, the method. 400 is implemented by another suitable flow monitoring engine.

At block 404, the flow information update circuitry 138 uses the determined flow ID to identify flow state information in the flow information table 124 that are to be updated in response to the ingressing packet. For example, the flow information table 124 comprises a plurality of entries that correspond to flow IDs, and the flow information update circuitry 138 uses the retrieved flow ID to identify a corresponding entry in the flow information table 124. In an embodiment, entries in the flow information table 140 are indexed by the flow ID, or by mapping the flow ID to an index into the flow information table 140. As merely an illustrative example, the index into the flow information table 140 is determined as:

Index=Flow-ID+Base_Address    Equation 1 where Base_Address is a base address of the flow information table 140 stored in a memory device of the packet processor 108/174.

At block 408, the flow information update circuitry 138 updates flow state information in the entry of the table 140 corresponding to the flow ID. In an embodiment, each entry of the table 140 includes flow state information corresponding to the respective flow. The flow state information includes one or more of i) a packet counter corresponding to the respective flow, ii) a byte counter corresponding to the respective flow, iii) a dropped packet counter corresponding to the respective flow, iv) a timestamp of a first received packet in the flow, v) a timestamp of a last received packet in the flow, etc., according to various embodiments. Each entry of the table 140 also includes configuration information corresponding monitoring the respective flow, and the flow monitoring engine 120 uses the configuration information included in the entry to determine how to update the flow state information in the entry, according to an embodiment. For instance, in an embodiment in which the flow monitoring engine 120/178 is configured to employ statistical sampling for determining packet counts, byte counts, etc., the configuration information includes one or more parameters related to packet sampling, and the flow monitoring engine 120/178 uses the packet sampling parameter(s) for performing sampling related to packet and/or byte counts, according to an embodiment.

Figure 5:
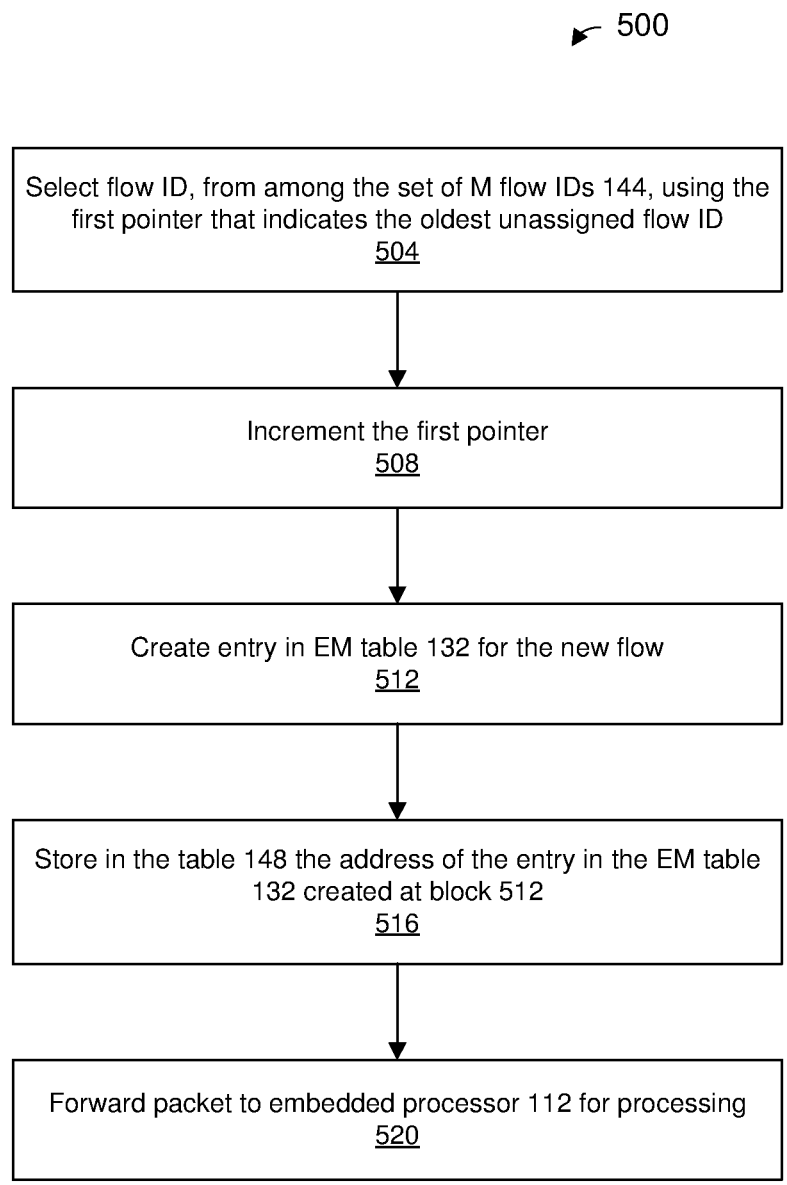
FIG. 5 is a flow diagram of an example method performed by a network device in response to an ingressing packet that does not belong to a flow recognized by the network device, according to an embodiment.

FIG. 5 is a flow diagram of an example method 500 performed by a flow monitoring engine in response to an ingressing packet that does not belong to an existing flow, according to an embodiment. The method 500 is implemented by a flow monitoring engine, such as the flow monitoring engine 120/178 (FIGS. 1A-B) or another suitable flow monitoring engine, according to an embodiment. For example, the method 500 is implemented at least partially by the flow learning hardware 140 (FIGS. 1A-B), according to an embodiment. The method 500 is described with reference to the flow monitoring engine 120/178 merely for explanatory purposes. In other embodiments, the method. 500 is implemented by another suitable flow monitoring engine.

At block 504, the flow learning hardware 140 selects a flow ID, from among the set of M flow IDs 144, for the new flow using the first pointer (e.g., the first pointer 208 (FIG. 2)) that indicates the oldest unassigned flow ID. In an embodiment, the method 500 assumes that there is always an unassigned flow ID, for example because a background process unassigns flow IDs at a sufficient rate to ensure there is always at least one unassigned flow ID. As another example, the flow monitoring engine 120/178 is configured to detect when there are no unassigned flow IDs and, in response, cause one or more of the flow IDs to be unassigned, as will be discussed further below.

In another embodiment, if there are no unassigned flow IDs, the method 500 ends (or is not performed in the first place) and the new flow is not learned; later, when another packet in the flow is received and when the background process has since unassigned one or more flow IDs, the method 500 is performed and the new flow is learned at that time.

At block 508, the flow learning hardware 140 increments the first pointer (e.g., the first pointer 208 (FIG. 2) in a circular or modulo manner in an embodiment, incrementing the first pointer 208 results in the flow ID that was previously indicated by the first pointer 208 being denoted as assigned.

At block 512, the flow learning hardware 140 creates an entry in the EM table 132 (FIG. 1A) corresponding to the flow, according to an embodiment. In an embodiment, block 512 includes storing the flow ID selected at block 504 in the created entry in the EM table 132. In an embodiment, block 512 comprises storing in the created entry in the EM table a 5-tuple such as {destination IP address, source IP address, L4 Protocol, UDP/TCP destination port, UDP/TCP source port} corresponding to the flow. In various other embodiments, block 512 comprises storing in the created entry in the EM table characteristic(s) of the flow such as one of, or any suitable combination of two or more of: i) a source address, ii) a destination address, iii) a packet type, iv) a VLAN ID, etc. In an embodiment, block 512 comprises storing in the created entry in the EM table an indication that packets in the flow should be forwarded to the embedded processor 112 for further analysis. For instance, in an embodiment in which a plurality of initial packets (e.g., the initial N packets) in a newly learned flow are to be forwarded to the embedded processor 112, the indication in the EM table prompts the flow monitoring engine 120 to forward packets to the embedded processor 112 until the embedded processor 112 removes the indication from the EM table (e.g., after the embedded processor 112 has received N packets in the flow).

In another embodiment, block 512 includes the flow learning hardware 140 creating a row in the TCAM of the TCAM-based flow classifier 178 corresponding to the flow, according to an embodiment. In an embodiment, block 512 comprises storing in the created row of the TCAM a 5-tuple such as {destination IP address, source IP address, L4 Protocol, UDP/TCP destination port, UDP/TCP source port} corresponding to the flow. In various other embodiments, block 512 comprises storing in the created row of the TCAM characteristic(s) of the flow such as one of, or any suitable combination of two or more of: i) a source address, ii) a destination address, iii) a packet type, iv) a VLAN ID, etc. In an embodiment, block 512 includes storing the flow ID selected at block 504 in an entry of the table 186 that corresponds to the created row in the TCAM. In an embodiment, block 512 further comprises storing, in the entry of the table 186 that corresponds to the created row in the TCAM, an indication that packets in the flow are to be forwarded to the embedded processor 112 for further analysis.

At block 516, the flow learning hardware 140 stores, in the table 148 (FIG. 1A), an address of the entry in the EM table 132 created at block 512 so that the embedded processor can locate the entry corresponding to the flow in the EM table 132. In an embodiment, the table 148 is indexed by the flow ID, or an index into the table is generated using a mapping function and the flow ID. Thus, in an embodiment, block 516 includes storing the address in a location corresponding to the flow ID selected at block 504. This allows the embedded processor 112 to uses the flow ID of a learned flow to look up, in the table 148, the location of an entry of the EM table 132 corresponding to the learned flow. This is useful for when the flow ID is later unassigned and the embedded processor 112 needs to reset the entry of the EM table 132.

In another embodiment, block 516 includes the flow learning hardware 140 storing, in the learned flows table 190 (FIG. 1B), an address of the row of the TCAM created at block 512 so that the embedded processor can locate the row in the TCAM corresponding to the flow using the flow ID for the purpose of resetting the row of the TCAM when the flow ID is being unassigned. In an embodiment, the table 190 is indexed by the flow ID, or an index into the table 190 is generated using a mapping function and the flow ID. Thus, in an embodiment, block 516 includes storing the row address in a location in the table 190 corresponding to the flow ID selected at block 504. This allows the embedded processor 112 to uses the flow ID of a learned flow to look up, in the table 190, the row in the TCAM corresponding to the learned flow. This is useful for when the flow ID is later unassigned and the embedded processor 112 needs to reset the row of the TCAM.

At block 520, the flow monitoring engine 120 forwards the ingressing packet to the embedded processor 520 for further processing.

Figure 6:
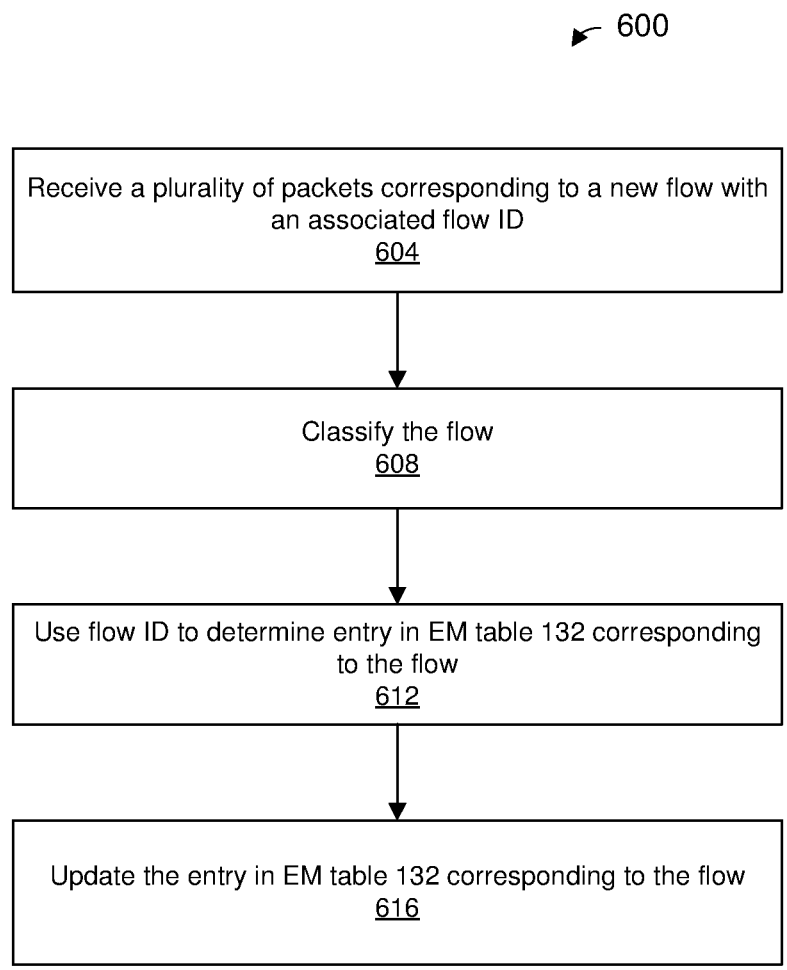
FIG. 6 is a flow diagram of an example method performed by a network device as part of learning a new flow that is not currently recognized by the network device, according to an embodiment.

FIG. 6 is a flow diagram of an example method 600 performed by an embedded processor as part of learning a new flow, according to an embodiment. The method. 600 is implemented by the embedded processor 112 (FIGS. 1A-B), according to an embodiment. The method 600 is described with reference to the packet processor 108/174 (FIGS. 1A-B) merely for explanatory purposes. In other embodiments, the method 600 is implemented by an embedded processor of another suitable packet processor. In an embodiment, the memory 150 stores machine readable instructions that, when executed by the embedded processor 112, cause the embedded processor 112 to perform the method 600.

At block 604, the embedded processor receives a plurality of packets of a new flow from the flow monitoring engine 120/178 of the packet processor 108/174. In an embodiment, the plurality of packets are associated with a flow ID that was assigned to the new flow by the flow monitoring engine 120/178.

At block 608, the embedded processor processes the plurality of packets received at block 604 to perform classification of the flow associated with the packets. In an embodiment, block 608 includes creating a flow record cache for the flow in the memory 150.

At block 612, the embedded processor uses the flow ID associated with the packets received at block 604 to lookup, in the table 148 (FIG. 1A), a location in the EM table 132 (FIG. 1A) corresponding to the flow. For example, the embedded processor uses the flow ID as an index into the table 148, in an embodiment. As another example, the embedded processor uses the flow ID and a mapping function to generate an index into the table 148, in an embodiment. For instance, the embedded processor adds the flow ID to a base address corresponding to the table 148 to generate an index into the table 148. The embedded processor uses the index into the table 148 to retrieve, from the table 148, an address in the EM table 132 corresponding to the flow, in an embodiment.

In another embodiment, the embedded processor uses the flow ID associated with the packets received at block 604 to lookup, in the table 190, a row in the TCAM corresponding to the flow. For example, the embedded processor uses the flow ID as an index into the table 190, in an embodiment. As another example, the embedded processor uses the flow ID and a mapping function to generate an index into the table 190, in an embodiment. The embedded processor uses the index into the table 190 to retrieve, from the table 190, a row address of the TCAM corresponding to the flow, in an embodiment.

At block 616, the embedded processor uses the address determined at block 612 to locate the entry in the EM table 132 corresponding to the flow, and then updates the entry in the EM table 132 corresponding to the flow. For example, in an embodiment in which the entry of the EM table 132 initially includes an indicator that the flow monitoring engine 120 should forward packets in the flow to the embedded processor 112, block 616 includes removing, from the entry of the EM table 132, the indicator that the flow monitoring engine 120 should forward packets in the flow to the embedded processor 112. For example, in an embodiment, after receiving and processing a certain number of packets (e.g., N) in the flow, the embedded processor no longer needs to receive further packets in the flow.

In an embodiment, blocks 608, 612, and 616 are performed in response to receiving the plurality of packets at block 604. In an embodiment, blocks 608, 612, and 616 are performed in response to receiving N packets from the flow monitoring engine 120, wherein N is a suitable positive integer.

In an embodiment, blocks 612 and 616 are omitted, i.e., the method 600 does not include blocks 612 and 616.

Figure 7:
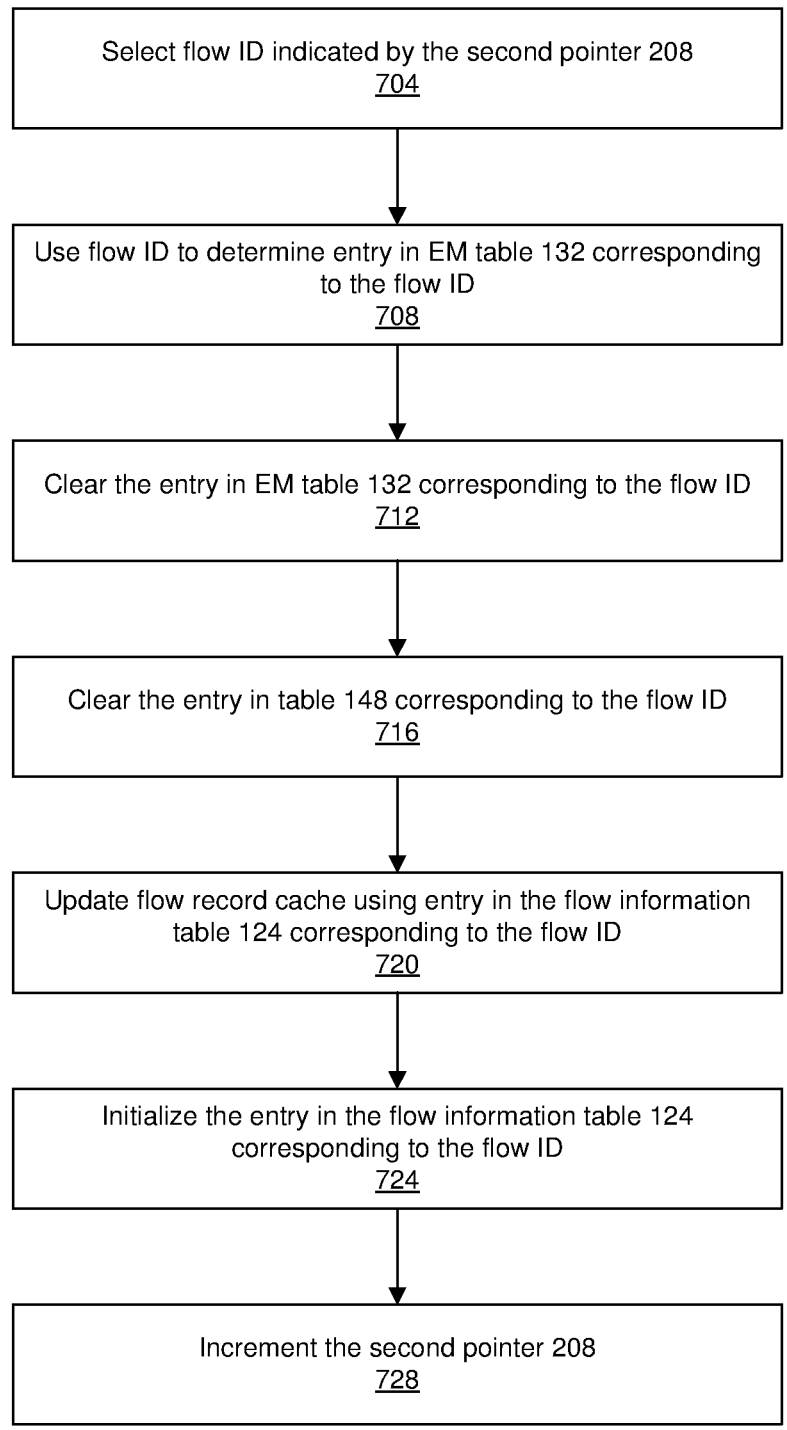
FIG. 7 is a flow diagram of an example method performed by a network device to unlearn a flow that is currently recognized by the network device, according to an embodiment.

FIG. 7 is a flow diagram of an example method 700 performed by an embedded processor to unlearn a flow, according to an embodiment. The method 700 is implemented by the embedded processor 112 (FIGS. 1A-B), according to an embodiment. The method 700 is described with reference to the packet processor 108/174 (FIGS. 1A-B) merely for explanatory purposes. In other embodiments, the method 700 is implemented by an embedded processor of another suitable packet processor. In an embodiment, the memory 150 stored machine readable instructions that, when executed by the embedded processor 112, cause the embedded processor 112 to perform the method 700. In an embodiment, the code 140 (FIGS. 1A-B) is configured to, when executed by the embedded processor 112, cause the embedded processor 112 to perform the method 700.

In an embodiment, the method 700 is implemented by the embedded processor 112 periodically at a particular rate (and as a background process) to ensure that there is always at least one unassigned flow ID available for when a new flow is detected. In an embodiment, the method 700 is implemented by the embedded processor 112 periodically at a particular rate chosen in connection with a number flow IDs that have been allocated. For example, the rate at which the method 700 is implemented by the embedded processor 112 is increased when the number flow IDs increases and/or exceeds a threshold.

In another embodiment, the method 700 is additionally or alternatively implemented by the embedded processor 112 aperiodically, such as in response to an event, such as a notification from the flow monitoring engine 120/178. For example, in an embodiment, when the flow monitoring engine 120/178 determines that all of the flow IDs have been allocated, the flow monitoring engine 120/178 prompts the embedded processor 112 to implement the method 700 so that at least one flow ID will be unassigned.

In an embodiment, the method 700 is implemented periodically only when at least P flow IDs are currently allocated, wherein P is a suitable positive integer less than M. In an embodiment, P is one. In other embodiments, P is 2, 3, 4, etc.

At block 704, the embedded processor select a flow ID that is indicated by the second pointer (e.g., the second pointer 212 of FIG. 2) that indicates the oldest assigned flow ID.

At block 708, the embedded processor uses the flow ID selected at block 704 to lookup, in the table 148 (FIG. 1A), a location in the EM table 132 (FIG. 1A) corresponding to the flow ID. For example, the embedded processor uses the flow ID as an index into the table 148, in an embodiment. As another example, the embedded processor uses the flow ID and a mapping function to generate an index into the table 148, in an embodiment. The embedded processor uses the index into the table 148 to retrieve, from the table 148, an address in the EM table 132 corresponding to the flow ID, in an embodiment.

In another embodiment, block 708 comprises the embedded processor using the flow ID selected at block 704 to lookup, in the table 190 (FIG. 1B), a row in the TCAM corresponding to the flow ID. For example, the embedded processor uses the flow ID as an index into the table 190, in an embodiment. As another example, the embedded processor uses the flow ID and a mapping function to generate an index into the table 190, in an embodiment. The embedded processor uses the index into the table 190 to retrieve, from the table 190, a row address of the TCAM corresponding to the flow ID, in an embodiment.

At block 712, the embedded processor 112 clears the entry in the EM table 132 (FIG. 1A) at the address determined at block 708. In an embodiment, block 712 includes deleting the flow ID from the entry in the EM table 132. In an embodiment, block 712 includes deleting from the entry in the EM table 132 information associated with/common to packets in the flow corresponding to the flow ID.

In another embodiment, block 712 comprises the embedded processor 112 clearing the TCAM row at the address determined at block 708. In an embodiment, block 712 includes deleting the flow ID from the entry in the table 186 corresponding to the TCAM row determined at block 708. In an embodiment, block 712 includes deleting from the row of the TCAM information associated with/common to packets in the flow corresponding to the flow ID.

At block 716, the embedded processor 112 clears the entry in the table 148 (FIG. 1A) corresponding to the flow ID. In another embodiment, block 716 comprises the embedded processor 112 clearing the entry in the table 190 (FIG. 1B) corresponding to the flow ID.

At block 720, the embedded processor 112 reads from an entry in the flow information table 124 flow state information corresponding to the flow ID and updates a flow record cache in the memory 150 corresponding to the flow ID. In an embodiment, the embedded processor 112 uses the flow ID to determine the entry in the flow information table 124. In an embodiment, block 720 includes creating the flow record cache in the memory 150 if the flow record cache in the memory 150 for the flow ID does not currently exist.

At block 724, the embedded processor 112 initializes flow state information in the entry in the flow information table 124.

At block 728, the embedded processor 112 increments the second pointer (e.g., the second pointer 212 (FIG. 2) in a circular or modulo manner. In an embodiment, block 728 includes embedded processor 112 instructing or prompting the flow monitoring engine 120 to increment the second pointer, and the flow monitoring engine 120 increments the second pointer in response to instruction/prompt from the embedded processor 112. In an embodiment, incrementing the second pointer results corresponds to denoting the flow ID that was previously indicated by the second pointer as being unassigned.

Figure 8:
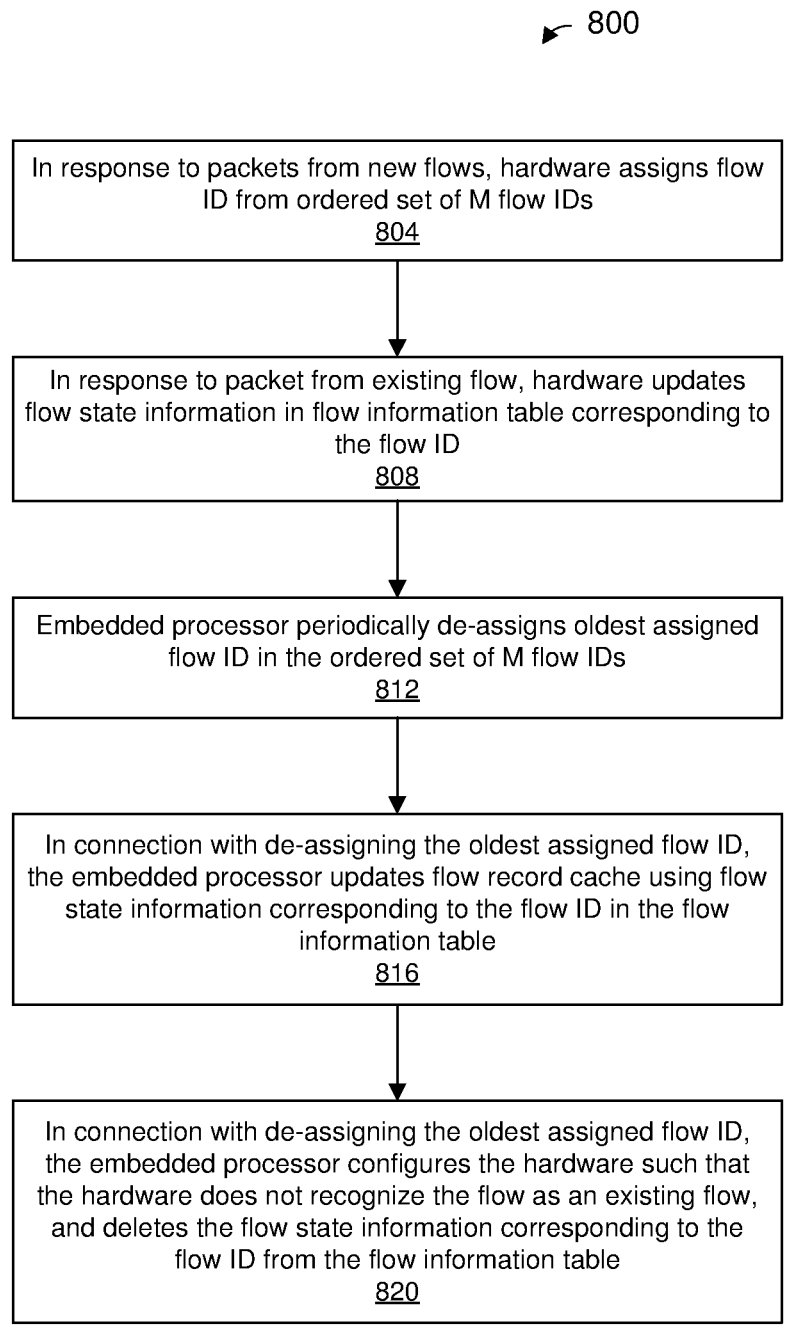
FIG. 8 is a flow diagram of an example method for monitoring flows of packets in a network device such as the network devices of FIGS. 1A and 1B, according to an embodiment.

FIG. 8 is a flow diagram of an example method 800 implemented by a network device such as the network device 100/170 of FIGS. 1A-B, according to an embodiment. The method 800 is described with reference to the network device 100/170 (FIGS. 1A-B) merely for explanatory purposes. In other embodiments, the method 800 is implemented by another suitable network device, such as a network device that utilizes a TCAM-based flow classification engine.

At block 804, flow classification hardware assigns a flow ID in response to ingressing packets that do not belong to flows that are recognized by the flow classification hardware as corresponding to currently assigned flow IDs. In an embodiment, the flow classification hardware selects a flow ID assigned at block 804 from an ordered set of M flow IDs. In an embodiment, block 804 includes the flow classification hardware selecting the flow ID as the oldest unassigned flow ID in the ordered set of M flow IDs. In an embodiment, the flow learning hardware circuitry 140 assigns flow IDs at block 804.

At block 808, the flow classification hardware updates flow state information in a flow information table in response to ingressing packets that belong to flows that are recognized by the flow classification hardware as corresponding to currently assigned flow IDs. In an embodiment, block 808 includes determining a flow ID corresponding to a flow to which an ingressing packet belongs, and using the flow ID to determine flow state information in the flow information table that is to be updated in response to the ingressing packet.

At block 812, an embedded processor periodically de-assigns an oldest assigned flow ID from among the ordered set of M flow IDs. In an embodiment, de-assigning the oldest assigned flow ID includes denoting the flow ID as not being currently assigned to any flow.

At block 816, in connection with de-assigning the oldest assigned flow ID at block 812, the embedded processor updates a flow record cache corresponding to the oldest assigned flow ID using information flow state information corresponding to the oldest assigned flow ID in the flow information table. In an embodiment, block 816 includes embedded processor using the flow ID to determine flow state information in the flow information table that is to be used to update the flow record cache. In an embodiment, block 816 includes the embedded processor creating the flow record cache corresponding to the oldest assigned flow ID.

At block 820, in connection with de-assigning the oldest assigned flow ID at block 812, the embedded processor configures the flow classification hardware such that the flow classification hardware does not recognize the flow corresponding to the oldest assigned flow ID as an existing flow. For example, the embedded processor configures the flow classification hardware such that the flow classification hardware does not recognize the flow as having an assigned flow ID from the ordered set of M flow IDs.

Embodiment 1

A network device, comprising: a packet processor coupled to a plurality of network ports, wherein the packet processor is configured to forward packets between the plurality of network ports, and wherein the packet processor includes: a first memory, and a flow classification hardware engine configured to: store flow state information regarding known flows of packets in a flow information table in the first memory in association with respective assigned flow identifiers (IDs), wherein the assigned flow IDs are from an ordered set of M flow IDs, wherein M is a positive integer, and in response to detecting new flows of packets: i) assign respective flow IDs, from the ordered set of M flow IDs, to the new flows, and ii) create respective entries in the flow information table for the new flows; and an embedded processor that is configured to execute machine readable instructions stored in a second memory coupled to the embedded processor, and wherein the second memory stores instructions that, when executed by the embedded processor, cause the embedded processor to, periodically, as part of a background process: i) identify an oldest assigned flow ID, from the ordered set of M flow IDs, and ii) make storage space in the flow information table corresponding to the oldest assigned flow ID available for a new flow.

Embodiment 2

The network device of embodiment 1, wherein: the flow classification hardware engine includes, or is coupled to, a table associated with known flows; the flow classification hardware engine is configured to store assigned IDs corresponding to known flows of packets in the table associated with known flows; wherein the second memory stores instructions that, when executed by the embedded processor, cause the embedded processor to, in conjunction with denoting the oldest assigned flow ID as unassigned, delete the oldest assigned flow ID from the table associated with known flows.

Embodiment 3

The network device of any of embodiments 1-2, wherein the second memory further stores instructions that, when executed by the embedded processor, cause the embedded processor to, in conjunction with denoting the oldest assigned flow ID as unassigned: delete, from the flow information table, flow state information regarding a flow corresponding to the oldest assigned flow ID to make storage space in the flow information table available for a new flow.

Embodiment 4

The network device of embodiment 3, wherein the second memory further stores instructions that, when executed by the embedded processor, cause the embedded processor to, in conjunction with denoting the oldest assigned flow ID as unassigned: copy the flow state information regarding the flow corresponding to the oldest assigned flow ID from the flow information table to the second memory.

Embodiment 5

The network device of any of embodiments 1-4, wherein: the flow classification hardware engine is configured to: in response to detecting a new flow of packets, select an oldest unassigned flow ID from the ordered set of M flow IDs to assign to the new flow; the second memory stores further instructions that, when executed by the embedded processor, cause the embedded processor to periodically: denote an oldest assigned flow ID, from the ordered set of M flow IDs, as unassigned in connection with making storage space in the flow information table corresponding to the oldest assigned flow ID available for a new flow.

Embodiment 6

The network device of embodiment 5, wherein: the first memory stores the ordered set of M flow IDs; a first pointer points to the oldest unassigned flow ID in the first memory; a second pointer points to the oldest assigned flow ID; the flow classification hardware engine is configured to select the oldest unassigned flow ID by selecting a flow ID in the set of one or more memories indicated by the first pointer, the flow classification hardware engine is further configured to increment the first pointer after selecting the flow ID indicated by the first pointer; and the second memory further stores instructions that, when executed by the embedded processor, cause the embedded processor to denote the oldest assigned flow ID as unassigned by incrementing the second pointer in connection with making storage space in the flow information table corresponding to the oldest assigned flow ID available for a new flow.

Embodiment 7

The network device of embodiment 6, wherein the second memory stores instructions that, when executed by the embedded processor, cause the embedded processor to prompt the flow classification hardware engine to increment the second pointer.

Embodiment 8

The network device of any of embodiments 1-7, wherein: the flow classification hardware engine comprises: i) a hash generator, and ii) an exact match table with entries corresponding to hash values associated with known flows; the exact match table respectively stores assigned flow IDs in entries corresponding to known flows, wherein entries of the exact match table correspond to hash values generated by the hash generator; and the second memory further stores instructions that, when executed by the embedded processor, cause the embedded processor to, in conjunction with denoting the oldest assigned flow ID as unassigned: delete the oldest assigned flow ID from an entry in the exact match table as part of making the entry available for a new flow.

Embodiment 9

The network device of any of embodiments 1-7, wherein: the flow classification hardware engine comprises: a ternary content addressable memory (TCAM) having rows corresponding to known flows; the second memory further stores instructions that, when executed by the embedded processor, cause the embedded processor to, in conjunction with denoting the oldest assigned flow ID as unassigned: update a row in the TCAM corresponding to the oldest assigned flow ID so that the row no longer corresponds to the flow corresponding to the oldest assigned flow ID and is available to be assigned to a new flow.

Embodiment 10

The network device of embodiment 9, wherein: the flow classification hardware engine further comprises: a table that respectively stores assigned flow IDs in entries corresponding to rows of the TCAM; and the second memory further stores instructions that, when executed by the embedded processor, cause the embedded processor to, in conjunction with denoting the oldest assigned flow ID as unassigned: delete the oldest assigned flow ID from the table that respectively stores assigned flow IDs in entries corresponding to rows of the TCAM in connection with making a row of the TCAM corresponding to the oldest assigned flow ID available for a new flow.

Embodiment 11

The network device of any of embodiments 1-10, further comprising: an external processor coupled to the packet processor; and a third memory coupled to the external processor; wherein the second memory stores instructions that, when executed by the embedded processor, cause the embedded processor to, send flow state information corresponding to flows to the external processor; and wherein the third memory stores instructions that, when executed by the external processor, cause the external processor to, in conjunction with receiving flow state information corresponding to the flows from the embedded processor, create flow records corresponding to the flows in the third memory.

Embodiment 12

A method for monitoring flows of packets in a network device, the method comprising: assigning, at a flow classification hardware engine of the network device, flow identifiers (IDs) in response to ingressing packets that belong new flows that are not recognized by the flow classification hardware engine as corresponding to currently assigned flow IDs, wherein assigning flow IDs includes, for each new flow, selecting an oldest unassigned flow ID from an ordered set of M flow IDs to assign to the new flow, and wherein M is a positive integer; creating, by the flow classification hardware engine, respective entries in a flow information table for the new flows; updating, by the flow classification hardware engine, flow state information in the flow information table in response to ingressing packets that belong to flows that are recognized by the flow classification hardware as corresponding to currently assigned flow IDs; performing, by an embedded processor of the network device, a background process to: periodically de-assign oldest assigned flow IDs from among the ordered set of M flow IDs, and in connection with de-assigning the oldest assigned flow IDs, make entries in the flow information table available for new flows.

Embodiment 13

The method of embodiment 12, further comprising: storing, by the flow classification hardware engine, assigned flow IDs corresponding to known flows of packets in a table associated with known flows; in conjunction with de-assigning oldest assigned flow IDs, deleting, by the embedded processor, the oldest assigned flow IDs from the table associated with known flows.

Embodiment 14

The method of any of embodiments 12-13, further comprising, in conjunction with de-assigning oldest assigned flow IDs: deleting, by the embedded processor, flow state information regarding flows corresponding to the oldest assigned flow IDs from the flow information table to make storage space in the flow information table available for new flows.

Embodiment 15

The method of embodiment 14, further comprising, in conjunction with denoting the oldest assigned flow ID as unassigned: copying, by the embedded processor, the flow state information regarding the flow corresponding to the oldest assigned flow ID from the flow information table to a second memory coupled to the embedded processor.

Embodiment 16

The method of any of embodiments 12-15, wherein: the first memory stores the ordered set of M flow IDs; a first pointer points to the oldest unassigned flow ID in the first memory; a second pointer points to the oldest assigned flow ID; the method further comprises: selecting, by the flow classification hardware engine, the oldest unassigned flow ID by selecting a flow ID in the set of one or more memories indicated by the first pointer, incrementing, by the flow classification hardware engine, the first pointer after selecting the flow ID indicated by the first pointer, and denoting, by the embedded processor, the oldest assigned flow ID as unassigned by incrementing the second pointer in connection with making storage space in the flow information table corresponding to the oldest assigned flow ID available for a new flow.

Embodiment 17

The method of embodiment 16, wherein incrementing, by the embedded processor, the second pointer comprises: prompting, by the embedded processor, the flow classification hardware engine to increment the second pointer.

Embodiment 18

The method of any of embodiments 12-17, further comprising: storing, in an exact match table associated with a hash generator of the flow classification hardware engine, assigned flow IDs in entries corresponding to known flows; and in conjunction with denoting the oldest assigned flow ID as unassigned, deleting, by the embedded processor, the oldest assigned flow ID from an entry in the exact match information table to make the entry available for a new flow.

Embodiment 19

The method of any of embodiments 12-18, wherein: in conjunction with denoting the oldest assigned flow ID as unassigned, updating, by the embedded processor, a row in a ternary content addressable memory (TCAM) of the flow classification hardware engine corresponding to the oldest assigned flow ID so that the row no longer corresponds to the flow corresponding to the oldest assigned flow ID and to make the row available for a new flow.

Embodiment 20

The method of embodiment 19, wherein: storing, in a table associated with the TCAM, assigned flow IDs in entries corresponding to rows of the TCAM; and in conjunction with denoting the oldest assigned flow ID as unassigned, deleting, by the embedded processor, the oldest assigned flow ID from the table associated with the TCAM in connection with making a row of the TCAM corresponding to the oldest assigned flow ID available for a new flow.

Embodiment 21

The method of any of embodiments 12-20, further comprising: in conjunction with denoting the oldest assigned flow ID as unassigned, sending, by the embedded processor, flow state information corresponding to flows to an external processor; and creating, by the external processor, flow records in a third memory corresponding to the flows in conjunction with receiving, from the embedded processor, flow state information corresponding to the flows.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any suitable computer readable memory. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A network device, comprising:
   a packet processor coupled to a plurality of network ports, wherein the packet processor is configured to forward packets between the plurality of network ports, and wherein the packet processor includes:
      a first memory, and
      a flow classification hardware engine configured to:
         store flow state information regarding known flows of packets in a flow information table in the first memory in association with respective assigned flow identifiers (IDs), wherein the assigned flow IDs are from an ordered set of M flow IDs stored in a plurality of ordered memory locations in the first memory, wherein M is a positive integer,
         in response to detecting new flows of packets: i) assign respective flow IDs, from the ordered set of M flow IDs, to the new flows, and ii) create respective entries in the flow information table for the new flows, and
         in response to detecting a new flow of packets, select an oldest unassigned flow ID from the ordered set of M flow IDs to assign to the new flow based on a location of the oldest unassigned flow ID within the plurality of ordered memory locations, and denote a new oldest unassigned flow ID, from the ordered set of M flow IDs, based on a location of the new oldest unassigned flow ID within the plurality of ordered memory locations; and
   an embedded processor that is configured to execute machine readable instructions stored in a second memory coupled to the embedded processor, and wherein the second memory stores instructions that, when executed by the embedded processor, cause the embedded processor to, periodically, as part of a background process: i) identify an oldest assigned flow ID, from the ordered set of M flow IDs, based on a location of the oldest assigned flow ID within the plurality of ordered memory locations, ii) make storage space in the flow information table corresponding to the oldest assigned flow ID available for a new flow, and iii) denote a new oldest assigned flow ID, from the ordered set of M flow IDs, based on a location of the new oldest assigned flow ID within the plurality of ordered memory locations.

2. The network device of claim 1, wherein:
   the flow classification hardware engine includes, or is coupled to, a table associated with known flows;
   the flow classification hardware engine is configured to store assigned IDs corresponding to known flows of packets in the table associated with known flows;
   wherein the second memory stores instructions that, when executed by the embedded processor, cause the embedded processor to, in conjunction with denoting the oldest assigned flow ID as unassigned, delete the oldest assigned flow ID from the table associated with known flows.

3. The network device of claim 1, wherein the second memory further stores instructions that, when executed by the embedded processor, cause the embedded processor to, in conjunction with denoting the oldest assigned flow ID as unassigned:

delete, from the flow information table, flow state information regarding a flow corresponding to the oldest assigned flow ID to make storage space in the flow information table available for a new flow.

4. The network device of claim 3, wherein the second memory further stores instructions that, when executed by the embedded processor, cause the embedded processor to, in conjunction with denoting the oldest assigned flow ID as unassigned:
copy the flow state information regarding the flow corresponding to the oldest assigned flow ID from the flow information table to the second memory.

5. The network device of claim 1, wherein:
the flow classification hardware engine comprises: i) a hash generator, and ii) an exact match table with entries corresponding to hash values associated with known flows;
the exact match table respectively stores assigned flow IDs in entries corresponding to known flows, wherein entries of the exact match table correspond to hash values generated by the hash generator; and
the second memory further stores instructions that, when executed by the embedded processor, cause the embedded processor to, in conjunction with denoting the oldest assigned flow ID as unassigned:
delete the oldest assigned flow ID from an entry in the exact match table as part of making the entry available for a new flow.

6. The network device of claim 1, wherein:
the flow classification hardware engine comprises: a ternary content addressable memory (TCAM) having rows corresponding to known flows;
the second memory further stores instructions that, when executed by the embedded processor, cause the embedded processor to, in conjunction with denoting the oldest assigned flow ID as unassigned:
update a row in the TCAM corresponding to the oldest assigned flow ID so that the row no longer corresponds to the flow corresponding to the oldest assigned flow ID and is available to be assigned to a new flow.

7. The network device of claim 6, wherein:
the flow classification hardware engine further comprises:
a table that respectively stores assigned flow IDs in entries corresponding to rows of the TCAM; and
the second memory further stores instructions that, when executed by the embedded processor, cause the embedded processor to, in conjunction with denoting the oldest assigned flow ID as unassigned:
delete the oldest assigned flow ID from the table that respectively stores assigned flow IDs in entries corresponding to rows of the TCAM in connection with making a row of the TCAM corresponding to the oldest assigned flow ID available for a new flow.

8. The network device of claim 1, further comprising:
an external processor coupled to the packet processor; and
a third memory coupled to the external processor;
wherein the second memory stores instructions that, when executed by the embedded processor, cause the embedded processor to, send flow state information corresponding to flows to the external processor; and
wherein the third memory stores instructions that, when executed by the external processor, cause the external processor to, in conjunction with receiving flow state information corresponding to the flows from the embedded processor, create flow records corresponding to the flows in the third memory.

9. The network device of claim 1, wherein:
the flow classification hardware engine configured to, in response to detecting a new flow of packets, select the oldest unassigned flow ID from the ordered set of M flow IDs to assign to the new flow using a first pointer that points to the oldest unassigned flow ID in the plurality of ordered memory locations, and change the first pointer to point to a new oldest unassigned flow ID, from the ordered set of M flow IDs, in the plurality of ordered memory locations; and
the second memory stores instructions that, when executed by the embedded processor, cause the embedded processor to, periodically, as part of a background process:
identify the oldest assigned flow ID using a second pointer that points to the oldest assigned flow ID in the plurality of ordered memory locations, and
denote the new oldest assigned flow ID at least by changing the second pointer to point to the new oldest assigned flow ID in the plurality of ordered memory locations.

10. The network device of claim 9, wherein:
the flow classification hardware engine is further configured to change the first pointer to point to the new oldest unassigned flow ID at least by incrementing the first pointer after selecting the flow ID indicated by the first pointer; and
the second memory further stores instructions that, when executed by the embedded processor, cause the embedded processor to denote the oldest assigned flow ID as unassigned at least by incrementing the second pointer in connection with making storage space in the flow information table corresponding to the oldest assigned flow ID available for a new flow.

11. The network device of claim 10, wherein the second memory stores instructions that, when executed by the embedded processor, cause the embedded processor to prompt the flow classification hardware engine to increment the second pointer.

12. The network device of claim 1, wherein:
the first memory comprises multiple memory devices including a first memory device and a second memory device;
the first memory device is configured to store the flow information table; and
the second memory device is configured to store the ordered set of M flow IDs.

13. A method for monitoring flows of packets in a network device, the method comprising:
assigning, at a flow classification hardware engine of the network device, flow identifiers (IDs) in response to ingressing packets that belong new flows that are not recognized by the flow classification hardware engine as corresponding to currently assigned flow IDs, wherein assigning flow IDs includes, for each new flow, selecting an oldest unassigned flow ID from an ordered set of M flow IDs stored in a plurality of ordered memory locations in a memory to assign to the new flow based on a location of the oldest unassigned flow ID within the plurality of ordered memory locations, and wherein M is a positive integer;
after selecting the oldest unassigned flow ID, denoting, at the flow classification hardware engine, a new oldest unassigned flow ID, from the ordered set of M flow IDs, based on a location of the new oldest unassigned flow ID within the plurality of ordered memory locations;

creating, by the flow classification hardware engine, respective entries in a flow information table for the new flows;

updating, by the flow classification hardware engine, flow state information in the flow information table in response to ingressing packets that belong to flows that are recognized by the flow classification hardware as corresponding to currently assigned flow IDs;

performing, by an embedded processor of the network device, a background process to:
  identify an oldest assigned flow ID among the ordered set of M flow IDs based on a location of the oldest assigned flow ID within the plurality of ordered memory locations,
  periodically de-assign oldest assigned flow IDs from among the ordered set of M flow IDs, wherein de-assigning the oldest assigned flow ID includes denoting a new oldest assigned flow ID, from the ordered set of M flow IDs, based on a location of the new oldest assigned flow ID within the plurality of ordered memory location, and
  in connection with de-assigning the oldest assigned flow IDs, make entries in the flow information table available for new flows.

14. The method of claim 13, further comprising:
storing, by the flow classification hardware engine, assigned flow IDs corresponding to known flows of packets in a table associated with known flows;
in conjunction with de-assigning oldest assigned flow IDs, deleting, by the embedded processor, the oldest assigned flow IDs from the table associated with known flows.

15. The method of claim 13, further comprising, in conjunction with de-assigning oldest assigned flow IDs:
deleting, by the embedded processor, flow state information regarding flows corresponding to the oldest assigned flow IDs from the flow information table to make storage space in the flow information table available for new flows.

16. The method of claim 15, further comprising:
storing the flow information table in the memory, the memory being a first memory; and
in conjunction with denoting the oldest assigned flow ID as unassigned:
  copying, by the embedded processor, the flow state information regarding the flow corresponding to the oldest assigned flow ID from the flow information table in the first memory to a second memory coupled to the embedded processor.

17. The method of claim 13, further comprising:
storing, in an exact match table associated with a hash generator of the flow classification hardware engine, assigned flow IDs in entries corresponding to known flows; and
in conjunction with denoting the oldest assigned flow ID as unassigned, deleting, by the embedded processor, the oldest assigned flow ID from an entry in the exact match information table to make the entry available for a new flow.

18. The method of claim 13, wherein:
in conjunction with denoting the oldest assigned flow ID as unassigned, updating, by the embedded processor, a row in a ternary content addressable memory (TCAM) of the flow classification hardware engine corresponding to the oldest assigned flow ID so that the row no longer corresponds to the flow corresponding to the oldest assigned flow ID and to make the row available for a new flow.

19. The method of claim 18, wherein:
storing, in a table associated with the TCAM, assigned flow IDs in entries corresponding to rows of the TCAM; and
in conjunction with denoting the oldest assigned flow ID as unassigned, deleting, by the embedded processor, the oldest assigned flow ID from the table associated with the TCAM in connection with making a row of the TCAM corresponding to the oldest assigned flow ID available for a new flow.

20. The method of claim 13, further comprising:
storing the flow information table in the memory, the memory being a first memory;
in conjunction with denoting the oldest assigned flow ID as unassigned, sending, by the embedded processor, flow state information corresponding to flows to an external processor; and
creating, by the external processor, flow records in a second memory corresponding to the flows in conjunction with receiving, from the embedded processor, flow state information corresponding to the flows.

21. The method of claim 13, wherein:
selecting the oldest unassigned flow ID from the ordered set of M flow IDs comprises using a first pointer that points to the oldest unassigned flow ID in the memory in the plurality of ordered memory locations;
identifying the oldest assigned flow ID, as part of performing the background process, comprises using a second pointer that points to the oldest assigned flow ID in the plurality of ordered memory locations; and
denoting the new oldest assigned flow ID, as part of performing the background process, comprises changing the second pointer to point to the new oldest assigned flow ID in the plurality of ordered memory locations.

22. The method of claim 21, further comprising:
storing the ordered set of M flow IDs in the memory, the memory being a first memory;
changing the first pointer comprises incrementing, by the flow classification hardware engine, the first pointer after selecting the flow ID indicated by the first pointer; and
denoting, by the embedded processor, the oldest assigned flow ID as unassigned by incrementing the second pointer in connection with making storage space in the flow information table corresponding to the oldest assigned flow ID available for a new flow.

23. The method of claim 22, wherein incrementing, by the embedded processor, the second pointer comprises:
prompting, by the embedded processor, the flow classification hardware engine to increment the second pointer.

24. The method of claim 13, further comprising:
storing the ordered set of M flow IDs in a first memory device of the memory; and
storing the flow information table in a second memory device of the memory.

* * * * *